(12) United States Patent
Choi

(10) Patent No.: US 11,541,841 B2
(45) Date of Patent: Jan. 3, 2023

(54) AIRBAG APPARATUS

(71) Applicants:HYUNDAI MOTOR COMPANY, Seoul (KR); KIA CORPORATION, Seoul (KR)

(72) Inventor: Jun Yeol Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/388,774

(22) Filed: Jul. 29, 2021

(65) Prior Publication Data

US 2022/0185222 A1 Jun. 16, 2022

(30) Foreign Application Priority Data

Dec. 10, 2020 (KR) .......................... 10-2020-0172635

(51) Int. Cl.
*B60R 21/2338* (2011.01)
*B60R 21/2346* (2011.01)

(52) U.S. Cl.
CPC ...... *B60R 21/2338* (2013.01); *B60R 21/2346* (2013.01); *B60R 2021/23384* (2013.01)

(58) Field of Classification Search
CPC ............ B60R 21/2338; B60R 21/2346; B60R 2021/23384
See application file for complete search history.

(56) References Cited

U.S. PATENT DOCUMENTS

| 7,021,657 | B2 | 4/2006 | Kassman et al. | |
| 7,784,828 | B2 * | 8/2010 | Matsu | B60R 21/233 |
| | | | | 280/739 |
| 9,150,189 | B1 * | 10/2015 | Nelson | B60R 21/239 |
| 9,216,712 | B1 | 12/2015 | Kwon | |
| 2007/0228710 | A1 | 10/2007 | Ishiguro et al. | |
| 2016/0280176 | A1 * | 9/2016 | Yamada | B60R 21/205 |
| 2018/0134244 | A1 | 5/2018 | Choi | |
| 2018/0345901 | A1 * | 12/2018 | Yamada | B60R 21/205 |

(Continued)

FOREIGN PATENT DOCUMENTS

| DE | 102005037998 A1 | 9/2006 |
| DE | 102017207882 A1 | 5/2018 |
| EP | 1747951 A1 | 1/2007 |

(Continued)

OTHER PUBLICATIONS

European Search Report issued in related Application No. 21188700. 5, dated Nov. 23, 2021 (8 pages).

*Primary Examiner* — Drew J Brown
(74) *Attorney, Agent, or Firm* — Lempia Summerfield Katz LLC

(57) ABSTRACT

Disclosed is an airbag apparatus capable of safely protecting a passenger by increasing the width of an airbag cushion in a leftward-rightward direction when the passenger comes into contact with the airbag cushion. The airbag apparatus includes: a first tether disposed inside the airbag cushion in a forward-backward direction, and a second tether disposed inside the airbag cushion in the leftward-rightward direction and connected to the first tether. When the passenger comes into contact with the airbag cushion upon deployment of the airbag cushion, the width of the airbag cushion in the leftward-rightward direction is increased.

11 Claims, 8 Drawing Sheets

(56) References Cited

U.S. PATENT DOCUMENTS

2021/0031716 A1\* 2/2021 Hiraiwa ................ B60R 21/237

FOREIGN PATENT DOCUMENTS

| JP | 2001301555 A | 10/2001 | | |
|---|---|---|---|---|
| JP | 2007-216954 A | 8/2007 | | |
| KR | 10-2014-0035141 A | 3/2014 | | |
| WO | 2006-083526 A1 | 8/2006 | | |
| WO | WO-2017199851 A1 \* | 11/2017 | ....... | B60R 21/23138 |

\* cited by examiner

AIRBAG APPARATUS

CROSS-REFERENCE TO THE RELATED APPLICATION

This application claims priority to and the benefit of Korean Patent Application No. 10-2020-0172635, filed on Dec. 10, 2020, the entire contents of which are incorporated herein by reference.

FIELD

The present disclosure relates to an airbag apparatus capable of safely protecting a passenger.

BACKGROUND

The statements in this section merely provide background information related to the present disclosure and may not constitute prior art.

An airbag is designed to cushion an impact on an occupant by appropriately inflating an airbag cushion in the event of a vehicle accident, thus reducing injury to the occupant. The inflation behavior of the airbag cushion plays a very important role in ensuring the safety of the occupant.

Particularly, the required behavior of the airbag cushion is to quickly inflate at the initial stage of deployment, thereby quickly restraining an occupant, and to appropriately discharge inflation gas inside the airbag cushion when the occupant comes into contact with the airbag cushion and applies a load thereto, thereby appropriately cushioning the occupant from an impact.

Further, an airbag apparatus must meet the requirements of various regulations, such as Low Risk Deployment (LRD) regulations. According to LRD regulations, it is additionally required that inflation gas be discharged through vent holes even at the initial stage of deployment of an airbag cushion in order to minimize the risk of injury to children or occupants located close to the airbag apparatus.

In the event of a small overlap collision of a vehicle (a collision between 25% of a portion in front of the driver's seat of a vehicle and an obstacle), an airbag for a passenger seat and a curtain airbag, which are mounted in the vehicle, are deployed at the initial stage of the collision. However, we have discovered that in many cases, while the body of the passenger sitting in the passenger seat contacts the airbag cushion for the passenger seat, the head of the passenger slips from the airbag cushion for the passenger seat into the gap between the airbag cushion for the passenger seat and the curtain airbag. We have found that in order to safely protect passengers, it is advantageous to increase the protection area of an airbag cushion as far as possible, however, because the pressure capacity of an inflator for deploying an airbag is restrictive, there is a limitation in the extent to which the protection area of an airbag cushion can be increased.

The information disclosed in this Background of the Present disclosure section is only for enhancement of understanding of the general background of the present disclosure, and should not be taken as an acknowledgement or any form of suggestion that this information forms the related art already known to a person skilled in the art.

SUMMARY

The present disclosure provides an airbag apparatus capable of safely protecting a passenger by increasing the width of an airbag cushion in a leftward-rightward direction when the passenger comes into contact with the airbag cushion.

In one form of the present disclosure, an airbag apparatus includes a first tether disposed inside an airbag cushion in a forward-backward direction, and a second tether disposed inside the airbag cushion in a leftward-rightward direction and connected to the first tether. Upon deployment of the airbag cushion, the first tether may be tensioned in the forward-backward direction, and the portion of the second tether that is connected to the first tether is pulled toward a passenger, thereby limiting the width of the airbag cushion in the leftward-rightward direction. When the passenger comes into contact with the airbag cushion, the first tether may be loosened, and the portion of the second tether that is connected to the first tether may be moved away from the passenger, thereby increasing the width of the airbag cushion in the leftward-rightward direction.

The first tether may be connected to the inner side surface of the airbag cushion that the passenger contacts.

A tether passage having left and right openings may be formed in the middle of the first tether. The second tether may pass through the tether passage to be connected to the first tether.

The second tether may be formed in the shape of a surface having a width in the forward-backward direction. The tether passage may be formed corresponding to the width of the second tether in the forward-backward direction so as to allow the second tether to pass therethrough. The two ends of the second tether may be connected to the inner side surface of the airbag cushion in the forward-backward direction.

When the airbag cushion is deployed, the front surface portion of the second tether may be pulled inside the tether passage toward the passenger. When the load of the passenger is applied to the airbag cushion, the front surface portion of the second tether, having been pulled toward the passenger, may spread in a direction away from the passenger.

The second tether may include a $2\text{-}1^{st}$ tether formed in a rope shape, the $2\text{-}1^{st}$ tether being connected at two ends thereof to front portions of the two opposite inner side surfaces of the airbag cushion, and a $2\text{-}2^{nd}$ tether formed in a rope shape, the $2\text{-}2^{nd}$ tether being connected at one end thereof to a portion of the $2\text{-}1^{st}$ tether that is adjacent to the tether passage and connected at the other end thereof to a rear portion of the inner side surface of the airbag cushion. The tether passage may be formed corresponding to the thickness of the $2\text{-}1^{st}$ tether so as to allow the $2\text{-}1^{st}$ tether to pass therethrough.

When the airbag cushion is deployed, the $2\text{-}1^{st}$ tether may be pulled inside the tether passage toward the passenger, and the $2\text{-}2^{nd}$ tether may be loosened. When the load of the passenger is applied to the airbag cushion, the $2\text{-}1^{st}$ tether and the $2\text{-}2^{nd}$ tether may be tensioned to the left and the right.

The tether passage may be provided in a plurality thereof, and the plurality of tether passages may be formed in the longitudinal direction of the first tether. The second tether may include a $2\text{-}1^{st}$ tether formed in a rope shape, the $2\text{-}1^{st}$ tether passing through a front one of the plurality of tether passages to be connected at two ends thereof to front portions of the two opposite inner side surfaces of the airbag cushion, and a $2\text{-}2^{nd}$ tether formed in a rope shape, the $2\text{-}2^{nd}$ tether passing through a rear one of the plurality of tether passages to be connected at two ends thereof to rear portions of the two opposite inner side surfaces of the airbag cushion.

In one form, a partition wall may be formed inside the tether passage in the leftward-rightward direction and divide the tether passage into a plurality of sub-passages.

One end of the second tether may be fixed to the inner side surface of the airbag cushion, and the other end of the second tether may be fixed to the middle portion of the first tether.

The second tether may be provided in a plurality thereof. One ends of the plurality of second tethers may be fixed at the same position, and the other ends of the plurality of second tethers may be fixed at different positions.

The airbag cushion may spread to the left and the right to increase the protection area for the passenger in the leftward-rightward direction so as to restrain the head of the passenger at an early stage and to reduce the internal pressure of the airbag cushion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
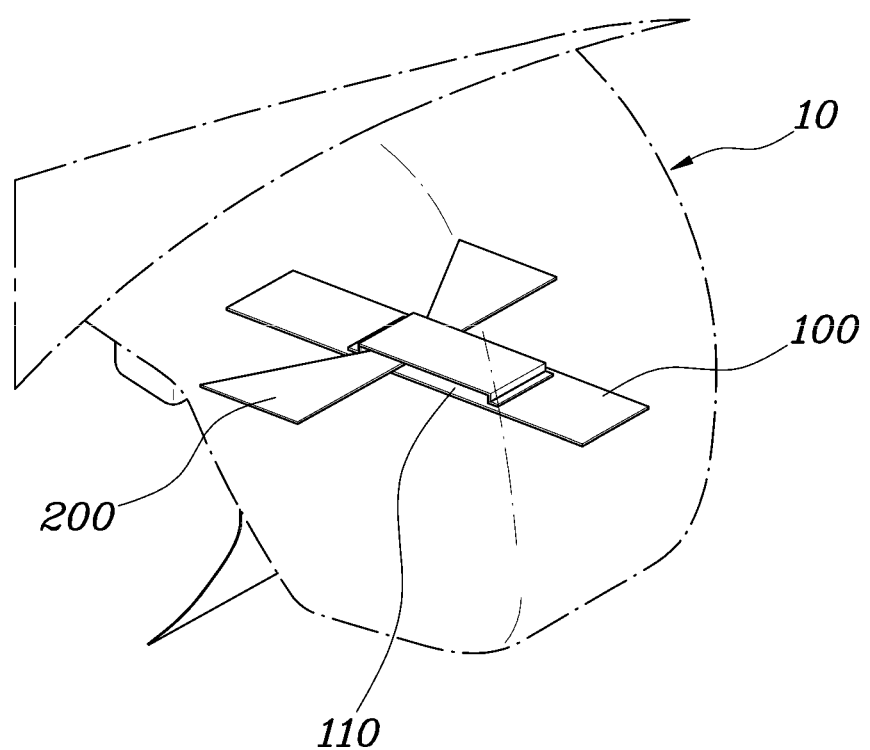
FIG. 1 is a view showing a deployed shape of an airbag apparatus and an internal tether structure thereof according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an airbag apparatus according to exemplary forms of the present disclosure will be described in detail with reference to the accompanying drawings.

FIG. 1 is a view showing the deployed shape of an airbag apparatus and an internal tether structure thereof according to one form of the present disclosure.

In one form, the airbag apparatus may be applied to a passenger seat. However, the airbag apparatus may also be applied to a driver's seat.

Referring to FIG. 1, the airbag apparatus in one form of the present disclosure includes: a first tether 100 which is disposed inside an airbag cushion 10 so as to be oriented in a forward-backward direction, and a second tether 200 which is disposed inside the airbag cushion 10 so as to be oriented in a leftward-rightward direction and to be connected to the first tether 100.

Due to this configuration, upon deployment of the airbag cushion 10, the first tether 100 is tensioned, and the portion of the second tether 200 that is connected to the first tether 100 is pulled toward a passenger, thereby limiting the width of the airbag cushion 10 in the leftward-rightward direction. When the passenger comes into contact with the airbag cushion 10, the first tether 100 is loosened, and the portion of the second tether 200 that is connected to the first tether 100 is moved away from the passenger, thereby increasing the width of the airbag cushion 10 in the leftward-rightward direction.

In detail, the front and rear ends of the first tether 100 are respectively sewn to the front inner surface and the rear inner surface of the airbag cushion 10.

In addition, the left and right ends of the second tether 200 are respectively sewn to the left inner surface and the right inner surface of the airbag cushion 10. The middle portion of the first tether 100 is caught in the middle portion of the second tether 200.

Accordingly, when the airbag cushion 10 is deployed in the event of a vehicle crash, the first tether 100 is tensioned by gas injected into the airbag cushion 10 at the initial stage of deployment of the airbag cushion 10, thereby determining the length of the airbag cushion 10 in the forward-backward direction.

At this time, since the middle portion of the second tether 200 is caught in the first tether 100, the connected portion of the second tether 200, which is caught in the first tether 100, is pulled toward the passenger, so the width of the airbag cushion 10 in the leftward-rightward direction is determined at the initial stage of deployment, and the airbag cushion 10 is prevented from being excessively deployed toward the head of the passenger.

In this state, when the head of the passenger comes into contact with the airbag cushion 10, the rear end of the first tether 100 is pushed forwards by the load of the passenger, and the tension of the first tether 100, which has been stretched tightly, decreases.

Then, the second tether 200 is pulled to the left and the right by the pressure of the gas supplied into the airbag cushion 10, so the connected portion of the second tether 200, which is caught in the first tether 100, is moved forwards away from the passenger, and the second tether 200 is tensioned to the left and the right.

Accordingly, the airbag cushion 10 spreads to the left and the right, and thus the width thereof in the leftward-rightward direction is increased. In this way, the protection area of the airbag cushion 10 is increased in the leftward-rightward direction. As a result, it is possible to restrain the head of the passenger at an early stage and to prevent the head of the passenger from escaping from the protection area of the airbag cushion 10, thus safely protecting the passenger.

In addition, after the head of the passenger is restrained by the airbag cushion, the gas in the airbag cushion is discharged to the outside through vent holes 12, which are formed in the two opposite side surfaces of the airbag cushion 10. Accordingly, the internal pressure of the airbag cushion 10 is reduced, thus more safely protecting the passenger.

As described above, the present disclosure increases the width of the airbag cushion 10 in the leftward-rightward direction when the passenger comes into contact with the airbag cushion 10. To this end, the first tether 100 may be connected to the inner side surface of the airbag cushion 10 that the passenger contacts.

That is, the rear end of the first tether 100 may be sewn to the portion of the rear inner surface of the airbag cushion 10 that the head of the passenger contacts.

Figure 3:
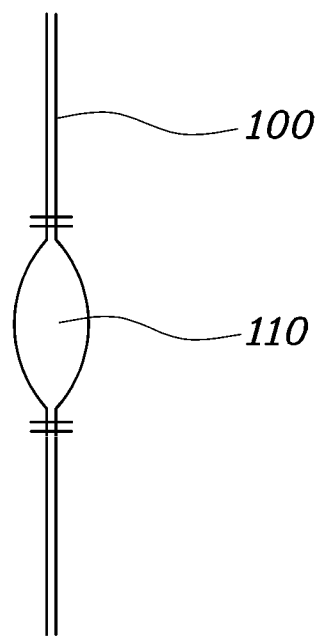
FIG. 3 is a view showing the configuration of a tether passage according to one form of the present disclosure.

FIG. 3 is a view showing the configuration of a tether passage 110 according to one form of the present disclosure. In one form, the second tether 200 may be connected to the first tether 100 in a manner such that the second tether 200 is slidably inserted into the first tether 100.

Referring to the drawings, a tether passage 110 having left and right openings is formed in the middle of the first tether 100, and the second tether 200 passes through the tether passage 110 and is connected to the first tether 100.

For example, after the entire area of the first tether 100 is folded in half or only the portion of the first tether 100 at which the tether passage 110 is to be formed is folded in half, a front portion of the overlapping portion and a rear portion of the overlapping portion are sewn with a predetermined interval therebetween, thereby forming the tether passage 110 therebetween.

Thereafter, the second tether 200 is slidably inserted into the tether passage 110 in a manner of passing through the left and right openings in the tether passage 110. Accordingly, the second tether 200 is connected to the first tether 100 in a manner such that the middle portion of the second tether 200 is caught in the inner surface of the tether passage 110.

Figure 2:
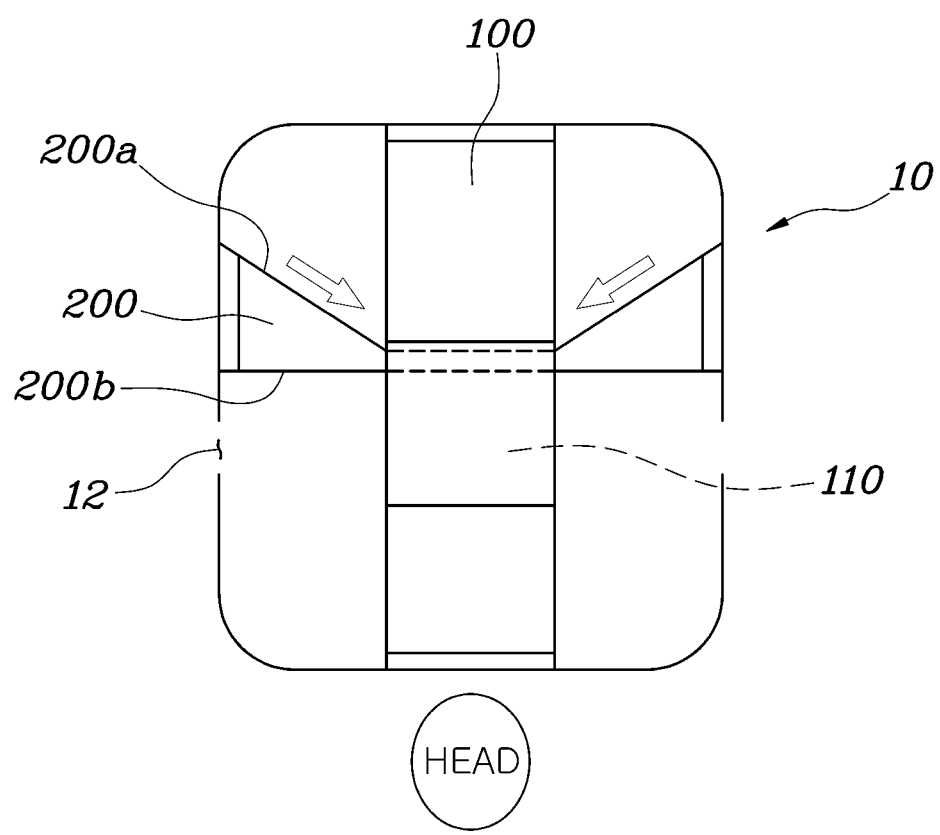
FIG. 2 is a view showing the configuration of a first form of the airbag apparatus according to another form of the present disclosure.
Figure 4:
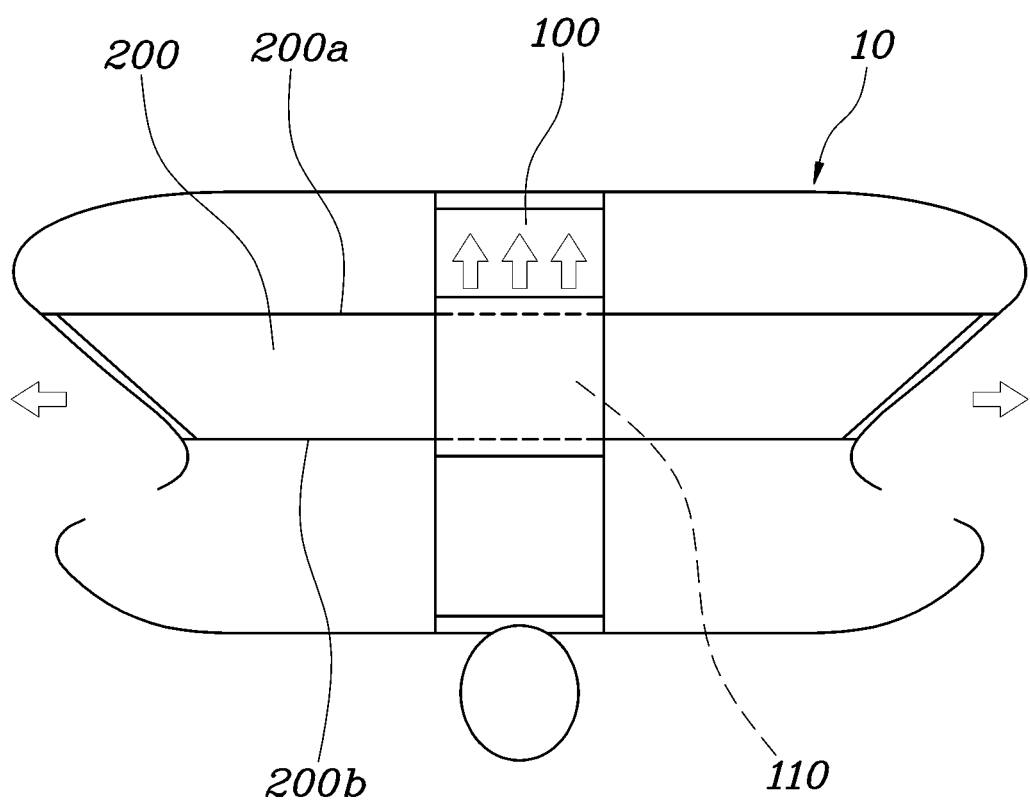
FIG. 4 is a view showing the expansion of an airbag cushion to the left and the right when a passenger comes into contact with the airbag cushion shown in FIG. 3.

FIG. 2 is a view showing the configuration of a first form of the airbag apparatus according to another form of the present disclosure, and FIG. 4 is a view showing the expansion of the airbag cushion 10 to the left and the right when the passenger comes into contact with the airbag cushion 10 shown in FIG. 2.

Referring to the drawings, the second tether 200 may be formed in the shape of a surface having a width in the forward-backward direction. The tether passage 110 may be formed corresponding to the width of the second tether 200 in the forward-backward direction so as to allow the second tether 200 to pass therethrough. The two ends of the second tether 200 may be connected to the inner side surface of the airbag cushion 10 in the forward-backward direction.

The first tether 100 may be formed in the shape of a rectangular band that is elongated in the forward-backward direction, and the second tether 200 may be formed in the shape of a rectangular band that is elongated in the leftward-rightward direction. Further, the second tether 200 may be formed such that the front side thereof is longer than the rear side thereof.

Accordingly, when the airbag cushion 10 is deployed, the front surface portion 200a of the second tether 200 is pulled inside the tether passage 110 toward the passenger, and when the load of the passenger is applied to the airbag cushion 10, the front surface portion 200a of the second tether 200, which has been pulled toward the passenger, spreads in a direction away from the passenger.

That is, when the airbag cushion 10 is deployed, the first tether 100 is tensioned toward the passenger at the initial stage of deployment of the airbag cushion 10 while pulling the front surface portion 200a of the second tether 200 inserted into the tether passage 110.

At this time, the rear surface portion 200b of the second tether 200 is tensioned to the left and the right without being caught in the inner surface of the tether passage 110, thereby preventing the width of the airbag cushion 10 in the leftward-rightward direction from excessively increasing and preventing the airbag cushion 10 from being excessively deployed toward the head of the passenger at the initial stage of deployment of the airbag.

In this state, when the head of the passenger comes into contact with the airbag cushion 10, the rear end of the first tether 100 is pushed forwards, so the tension of the first tether 100, which has been stretched tightly, decreases.

Then, the force that pulls the front surface portion 200a of the second tether 200 toward the passenger is removed, and the front surface portion 200a of the second tether 200 is pulled to the left and the right by the gas supplied into the airbag cushion 10. Accordingly, the front surface portion 200a of the second tether 200 is moved forwards and is thus tensioned to the left and the right.

As a result, as shown in FIG. 4, the width of the airbag cushion 10 in the leftward-rightward direction is increased, and thus the protection area of the airbag cushion 10 is increased in the leftward-rightward direction, thereby preventing the head of the passenger from escaping from the protection area of the airbag cushion 10, thus safely protecting the passenger.

Figure 5:
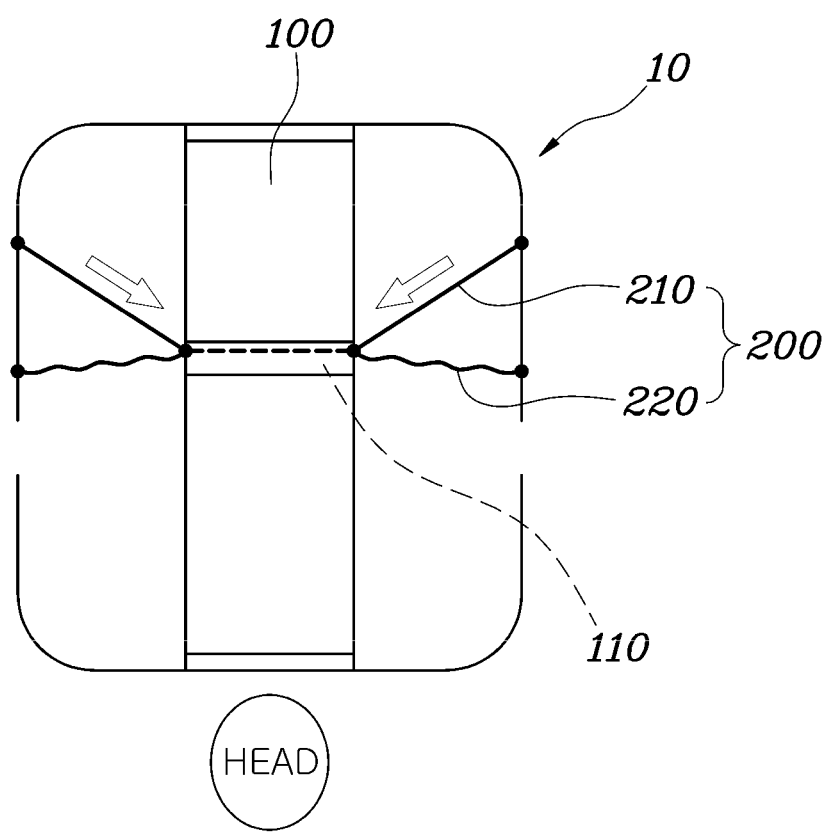
FIG. 5 is a view showing the configuration of a second form of the airbag apparatus according to another form of the present disclosure.
Figure 6:
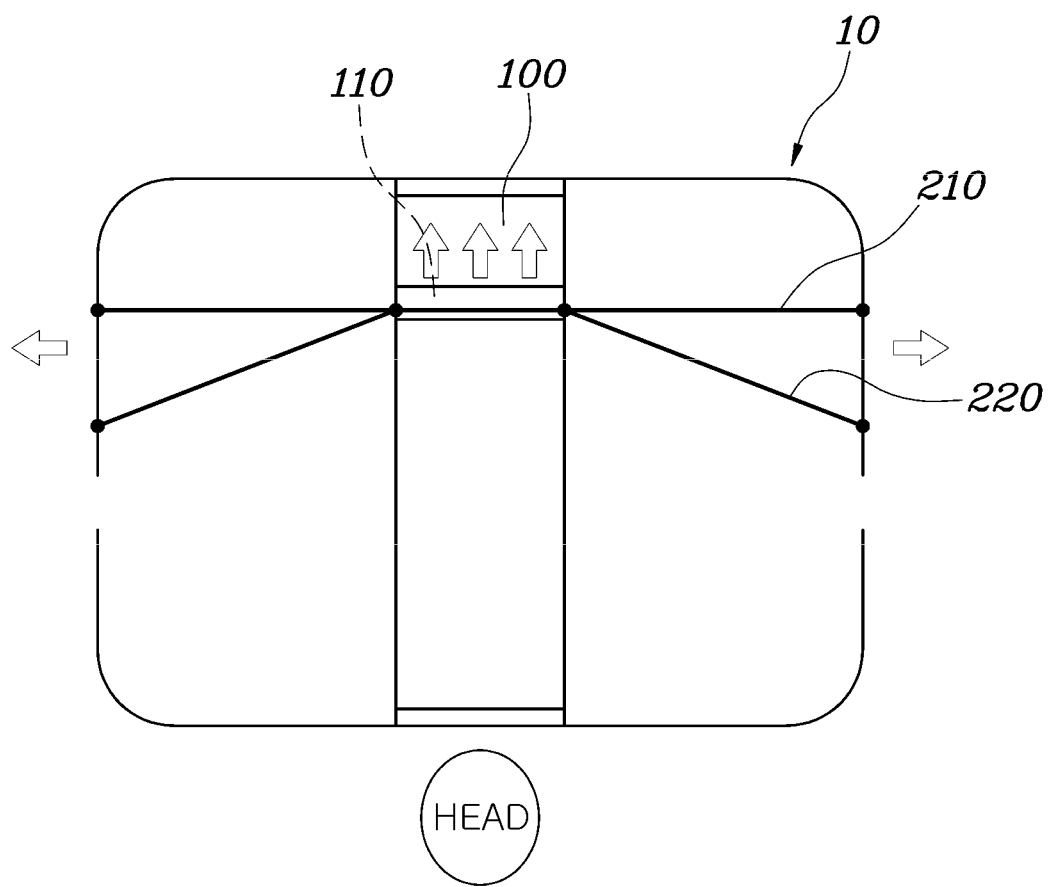
FIG. 6 is a view showing the expansion of the airbag cushion to the left and the right when a passenger comes into contact with the airbag cushion shown in FIG. 5.

FIG. 5 is a view showing the configuration of a second form of the airbag apparatus according to another form of the present disclosure, and FIG. 6 is a view showing the expansion of the airbag cushion 10 to the left and the right when the passenger comes into contact with the airbag cushion 10 shown in FIG. 5.

Referring to the drawings, the second tether 200 may include a $2\text{-}1^{st}$ tether 210, which is formed in a rope shape and is connected at two ends thereof to front portions of the two opposite inner side surfaces of the airbag cushion 10, and a $2\text{-}2^{nd}$ tether 220, which is formed in a rope shape and is connected at one end thereof to a portion of the $2\text{-}1^{st}$ tether 210 that is adjacent to the tether passage 110 and is connected at the other end thereof to a rear portion of the inner side surface of the airbag cushion 10.

The tether passage 110 is formed corresponding to the thickness of the $2\text{-}1^{st}$ tether 210 so as to allow the $2\text{-}1^{st}$ tether 210 to pass therethrough.

Accordingly, when the airbag cushion 10 is deployed, the $2\text{-}1^{st}$ tether 210 is pulled inside the tether passage 110 toward the passenger, and the $2\text{-}2^{nd}$ tether 220 is loosened. When the load of the passenger is applied to the airbag cushion 10, the $2\text{-}1^{st}$ tether 210 and the $2\text{-}2^{nd}$ tether 220 are tensioned to the left and the right.

Vent holes 12 are formed in the two opposite side surfaces of the airbag cushion 10 to which the $2\text{-}2^{nd}$ tether 220 is connected. The vent holes 12 are located adjacent to the $2\text{-}2^{nd}$ tether 220. The vent holes 12 serve to discharge the air supplied into the airbag cushion 10 to the outside.

That is, when the airbag cushion 10 is deployed, the first tether 100 is tensioned toward the passenger at the initial stage of deployment of the airbag cushion 10 while pulling the $2\text{-}1^{st}$ tether 210 inserted into the tether passage 110, thereby preventing the width of the airbag cushion 10 in the leftward-rightward direction from excessively increasing and preventing the airbag cushion 10 from being excessively deployed toward the head of the passenger at the initial stage of deployment of the airbag.

At this time, the $2\text{-}2^{nd}$ tether 220 is loosened such that the tension thereof is reduced.

In this state, when the head of the passenger comes into contact with the airbag cushion 10, the first tether 100 is pushed forwards, so the tension of the first tether 100, which has been stretched tightly, decreases.

Then, the force that pulls the 2-$1^{st}$ tether 210 toward the passenger is removed, and the 2-$1^{st}$ tether 210 is pulled to the left and the right by the gas supplied into the airbag cushion 10. Accordingly, the 2-$1^{st}$ tether 210 is moved forwards and is thus tensioned to the left and the right.

Simultaneously, the 2-$2^{nd}$ tether 220 connected to the 2-$1^{st}$ tether 210 is also tensioned to the left and the right.

As a result, as shown in FIG. 6, the width of the airbag cushion 10 in the leftward-rightward direction is increased, and thus the protection area of the airbag cushion 10 is increased in the leftward-rightward direction, thereby preventing the head of the passenger from escaping from the protection area of the airbag cushion 10, thus safely protecting the passenger.

Particularly, even when the passenger is located close to the airbag cushion 10 upon deployment of the airbag, the head of the passenger pushes the first tether 100, and thus the width of the airbag cushion 10 in the leftward-rightward direction is increased, thereby meeting the requirements of LRD regulations.

Figure 7:
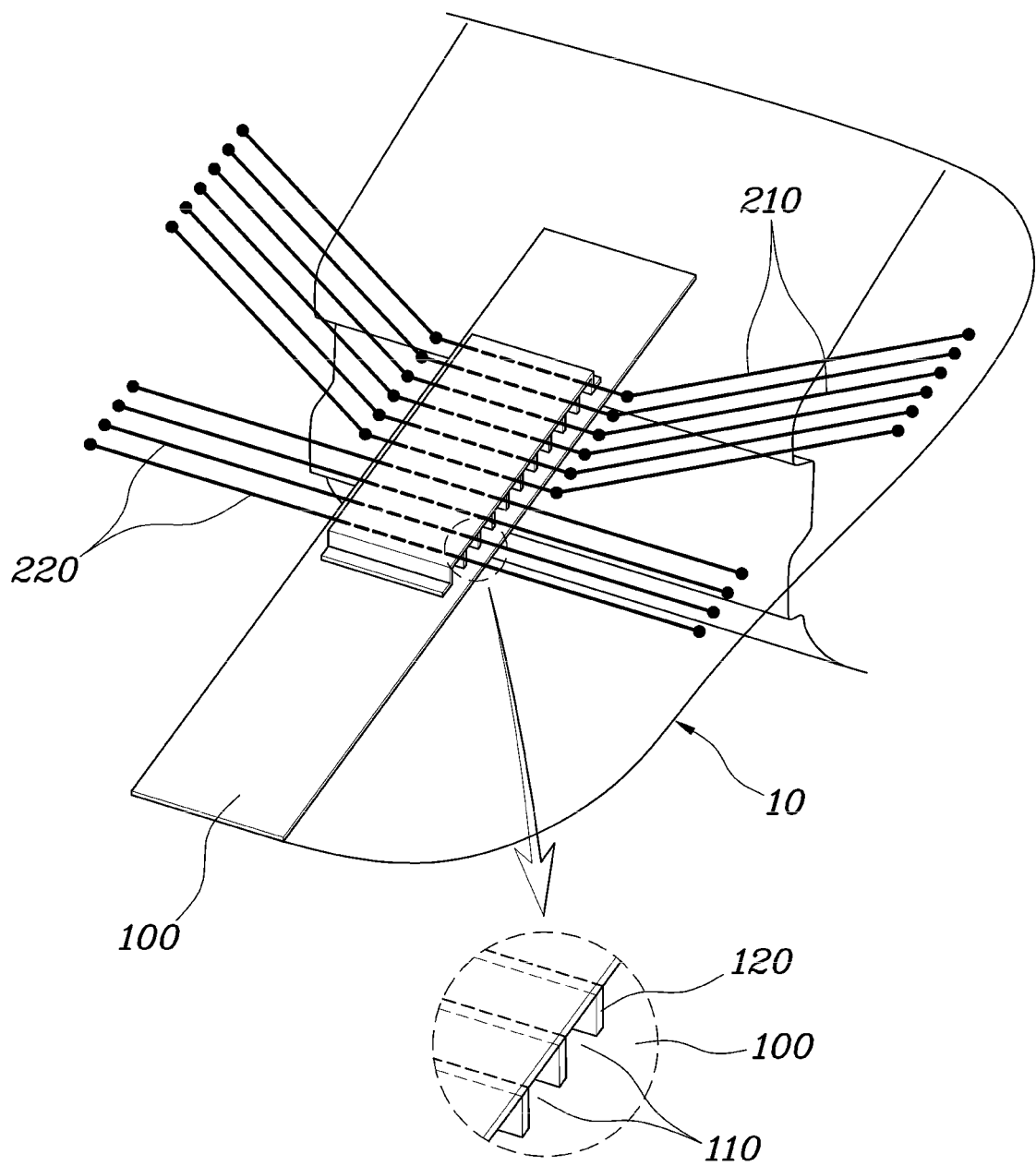
FIG. 7 is a view showing the configuration of a third form of the airbag apparatus according to another form of the present disclosure.

FIG. 7 is a view showing the configuration of a third form of the airbag apparatus according to one form of the present disclosure.

Referring to the drawings, a plurality of tether passages 110 is formed in the longitudinal direction of the first tether 100, that is, in the forward-backward direction.

The second tether 200 may include a 2-$1^{st}$ tether 210, which is formed in a rope shape, passes through a front one of the tether passages 110, and is connected at two ends thereof to front portions of the two opposite inner side surfaces of the airbag cushion 10, and a 2-$2^{nd}$ tether 220, which is formed in a rope shape, passes through a rear one of the tether passages 110, and is connected at two ends thereof to rear portions of the two opposite inner side surfaces of the airbag cushion 10.

For example, a plurality of tether passages 110 is formed in the longitudinal direction of the first tether 100, that is, in the forward-backward direction, and a plurality of tethers is provided such that each of the tethers passes through a respective one of the tether passages 110.

Further, a plurality of 2-$1^{st}$ tethers 210 passing through front ones of the tether passages 110 forms a group, and is connected to the front portion of the airbag cushion 10, and a plurality of 2-$2^{nd}$ tethers 220 passing through rear ones of the tether passages 110 forms a group, and is connected to the rear portion of the airbag cushion 10.

That is, the second tether 200 is constituted by a plurality of rope-shaped members. It is possible to control the shape of the airbag cushion 10 by adjusting the lengths of the rope-shaped members of the second tether 200 and the positions at which the rope-shaped members of the second tether 200 are connected to the airbag cushion 10 depending on the performance or the purpose of the airbag cushion 10.

To this end, the lengths of the rope-shaped members of the second tether 200 may be set for respective sections in which the rope-shaped members of the second tether 200 are connected to the airbag cushion 10.

As shown in FIG. 7, a plurality of tether passages 110 is formed in the longitudinal direction of the first tether 100. To this end, a plurality of partition walls 120 is arranged with predetermined intervals therebetween in the longitudinal direction of the first tether 100 inside the tether passage of the previous forms described above with reference to FIGS. 1 to 6. Each of the plurality of tether passages 110 is defined between two adjacent partition walls 120.

That is, a plurality of partition walls 120 is arranged at regular intervals in the longitudinal direction of the first tether 100, that is, in the forward-backward direction, and is sewn to the tether passage of the previous forms described above, whereby a plurality of tether passages 110 is formed with the partition wall 120 interposed therebetween.

Figure 8:
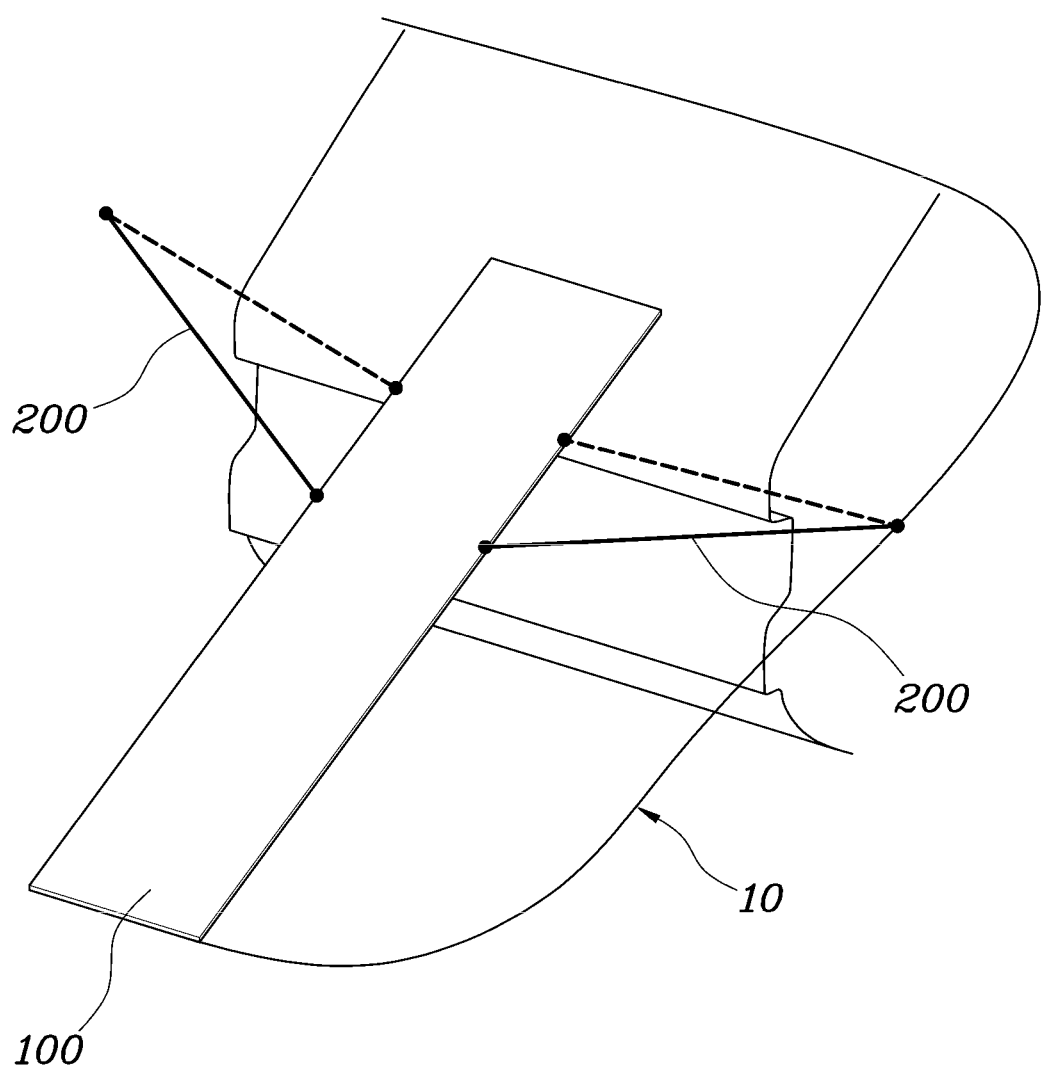
FIG. 8 is a view showing the configuration of a fourth form of the airbag apparatus according to one form of the present disclosure.

FIG. 8 is a view showing the configuration of a fourth form of the airbag apparatus according to one form of the present disclosure.

Referring to the drawings, one end of the second tether 200 is fixed to the inner side surface of the airbag cushion 10, and the other end of the second tether 200 is fixed to the middle portion of the first tether 100.

For example, the second tether 200 may be sewn to each of the two opposite side surfaces of the middle portion of the first tether 100.

The length of the second tether 200 may be adjusted depending on the performance or the purpose of the airbag cushion 10. It is preferable that the length of the second tether 200 be set to be sufficient so as not to excessively limit the width of the airbag cushion 10 in the leftward-rightward direction when the width of the airbag cushion 10 in the leftward-rightward direction is increased due to contact of the head of the passenger with the airbag cushion 10.

Alternatively, as shown in FIG. 8, the second tether 200 may be plural in number.

When a plurality of second tethers 200 is provided, one ends of the second tethers 200 may be fixed at the same position, and the other ends of the second tethers 200 may be fixed at different positions.

That is, two or more second tethers 200 may be provided depending on the performance or the purpose of the airbag cushion 10.

As is apparent from the above description, according to the airbag apparatus of the present disclosure, when a passenger comes into contact with the airbag cushion, the width of the airbag cushion in the leftward-rightward direction is increased, and thus the protection area of the airbag cushion is increased in the leftward-rightward direction. As a result, it is possible to restrain the head of the passenger at an early stage and to prevent the head of the passenger from escaping from the protection area of the airbag cushion, thus safely protecting the passenger.

Although exemplary forms of the present disclosure have been disclosed for illustrative purposes, those skilled in the art will appreciate that various modifications, additions and substitutions are possible, without departing from the scope and spirit of the present disclosure.

What is claimed is:
1. An airbag apparatus, comprising:
 a first tether disposed inside an airbag cushion in a forward-backward direction; and
 at least one second tether disposed inside the airbag cushion in a leftward-rightward direction and connected to the first tether,
 wherein when the airbag cushion is deployed, a width of the airbag cushion is limited in the leftward-rightward direction as the first tether is tensioned in the forward-backward direction and a portion of the at least one second tether is pulled toward a passenger,
 wherein, when the passenger comes into contact with the airbag cushion, the first tether is loosened, and the portion of the at least one second tether is moved away from the passenger such that the width of the deployed airbag cushion increases in the leftward-rightward direction, wherein at least one tether passage having left and right openings is formed in a middle of the first tether, and wherein the at least one second tether passes through the at least one tether passage to be connected to the first tether.

2. The airbag apparatus of claim 1, wherein the first tether is connected to an inner side surface of the airbag cushion.

3. The airbag apparatus of claim 1, wherein:

the at least one second tether is formed in a shape of a surface having a width in the forward-backward direction, the at least one tether passage is formed corresponding to the width of the at least one second tether in the forward-backward direction so as to allow the at least one second tether to pass therethrough, and two ends of the at least one second tether are connected to an inner side surface of the airbag cushion in the forward-backward direction.

4. The airbag apparatus of claim 3, wherein, when the airbag cushion is deployed, a front surface portion of the at least one second tether is pulled inside the at least one tether passage toward the passenger, and wherein, when a load of the passenger is applied to the airbag cushion, the front surface portion of the at least one second tether, having been pulled toward the passenger, spreads in a direction away from the passenger.

5. The airbag apparatus of claim 1, wherein the at least one second tether comprises:

a $2\text{-}1^{st}$ tether formed in a rope shape, the $2\text{-}1^{st}$ tether being connected at two ends thereof to front portions of two opposite inner side surfaces of the airbag cushion; and a $2\text{-}2^{nd}$ tether formed in a rope shape, the $2\text{-}2^{st}$ tether being connected at a first end thereof to a portion of the $2\text{-}1^{st}$ tether that is adjacent to the at least one tether passage and connected at a second end thereof to a rear portion of an inner side surface of the airbag cushion, and wherein the at least one tether passage is formed corresponding to a thickness of the $2\text{-}1^{st}$ tether so as to allow the $2\text{-}1^{st}$ tether to pass through the at least one tether passage.

6. The airbag apparatus of claim 5, wherein, when the airbag cushion is deployed, the $2\text{-}1^{st}$ tether is pulled inside the at least one tether passage toward the passenger, and the $2\text{-}2^{nd}$ tether is loosened, and wherein, when a load of the passenger is applied to the airbag cushion, the $2\text{-}1^{st}$ tether and the $2\text{-}2^{nd}$ tether are tensioned in the leftward-rightward direction.

7. The airbag apparatus of claim 1, wherein the at least one tether passage comprises a plurality of tether passages, and the plurality of tether passages is formed in a longitudinal direction of the first tether, and wherein the at least one second tether comprises:

a $2\text{-}1^{st}$ tether formed in a rope shape, configured to pass through a front tether passage of the plurality of tether passages, and connected at two ends thereof to front portions of two opposite inner side surfaces of the airbag cushion; and a $2\text{-}2^{nd}$ tether formed in a rope shape, configured to pass through a rear tether passage of the plurality of tether passages, and connected at two ends thereof to rear portions of the two opposite inner side surfaces of the airbag cushion.

8. The airbag apparatus of claim 1, further comprising: a partition wall formed inside the at least one tether passage in the leftward-rightward direction and configured to divide the at least one tether passage into a plurality of sub-passages.

9. The airbag apparatus of claim 1, wherein a first end of the at least one second tether is fixed to an inner side surface of the airbag cushion, and wherein a second end of the at least one second tether is fixed to a middle portion of the first tether.

10. The airbag apparatus of claim 9, wherein the at least one second tether comprises a plurality second tethers, and wherein first ends of the plurality of second tethers are fixed at a same position, and second ends of the plurality of second tethers are fixed at different positions.

11. The airbag apparatus of claim 1, wherein the airbag cushion is configured to expand and increase a protection area for the passenger in the leftward-rightward direction so as to restrain a head of the passenger at an early stage and to reduce an internal pressure of the airbag cushion.

\* \* \* \* \*